(12) United States Patent
Drummond

(10) Patent No.: X8059
(45) Date of Patent: Mar. 10, 1834

(54) HOISITING MACHINE

(76) Inventor: John Drummond

John Drummond
Letters Patent. (Patented March 11. 1834)

The Schedule referred to in these Letters Patent, and making part of the same, containing a description in the words of the said John Drummond himself of his Improvement, being a Hoisting Machine for raising heavy bodies to any required height, by means of multiplying power by cog and pinion wheels, entitled "Drummond's Hoisting Machine."

---

Be it known that I, John Drummond, of the City, County and State of New York, have made an Improvement in the useful Arts, being a Hoisting Machine for raising heavy bodies to any required height, by means of multiplying power by cog and pinion wheels entitled "Drummond's Hoisting Machine" which is described as follows.

This machine consists of the following principal parts; the base or platform on which the machine rests two stands or supports to receive the boxes and gudgeons of the machine. An axle for two large wheels and a small center pinion; an axle on which is fixed the two small pinions working into the large cog wheels; a lever on which is hung a stud wheel.

The platform on which the machine rests is made of any solid material, of a convenient size and shape to receive the machinery.

Two stands or supports made of wood or metal of a semicircular shape, having openings in them to receive the gudgeons & boxes of the axles are made fast to the platform.

There are two large cog wheels and a small cog wheel between them placed in the upper axle, turning on gudgeons, on the supports, one of these large wheels having a barrel on it to receive a rope, and the other loose on the shaft or axle; the other large wheel, to which is attached a small pinion, is hung loose on this axle.

On the lower axle are two small pinion wheels, one fast and the other loose: the fast pinion working into the loose cog wheel on the upper axle; the loose pinion working into the large cog wheel made fast on the upper axle.

The lever and stud wheel. A pinion or stud wheel which is attached to one end of a lever, the other end fast and hung loosely on the upper axle; this pinion works into the loose broad pinion on the lower axle.

Operation.

The crank, or driving power being applied to the lower axle and the body to be raised attached to the rope, the pinion made fast on the lower axle, works into the loose lage cog wheel on the upper axle the small pinion attached to this wheel, works into the stud wheel on the end of the lever, the stud wheel works into the one half of the broad pinion on the lower shaft, the other half of the broad pinion works into the large cog wheel with the drum fast on the upper shaft, by the motion of which, the rope is wound upon the drum, and the weight hoisted.

— The invention here claimed, and desired to be secured by Letters Patent, consists of the arrangement and adaptation of the several parts of the machine, so as to produce the hoisting machine before described.

For a further illustration of my invention, I refer to the model and drawing of the same deposited in the Patent Office.

Done at the City of Washington this 20th day of February, 1834.

Witnesses
C. F. Little
Robt. Clarke

John Drummond

Exd. W.C.
(552)

Drawing